E. W. WALTON.
GANG-PLOW.
No. 185,601. Patented Dec. 19, 1876.
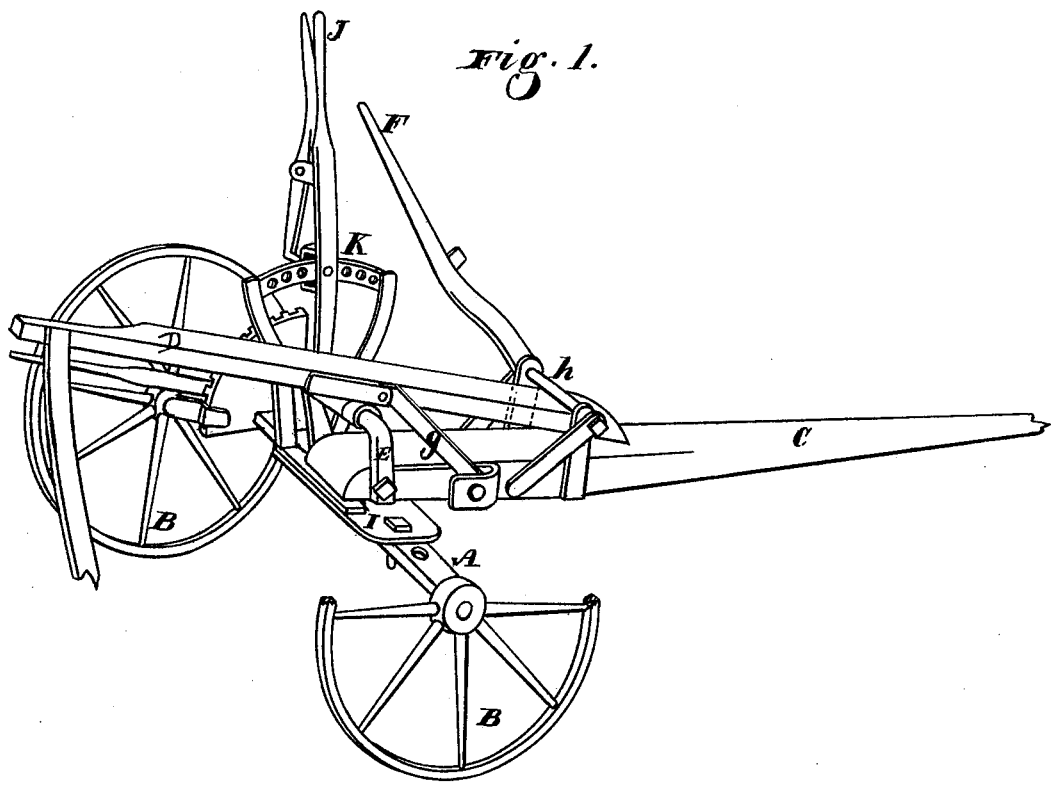
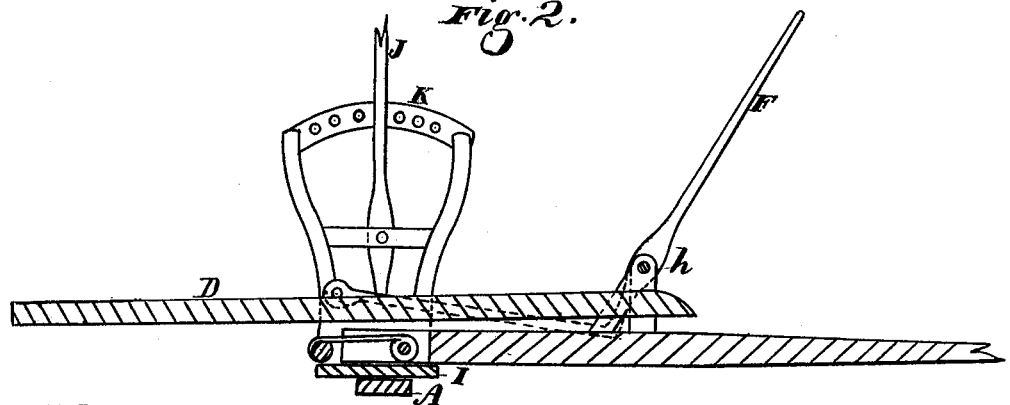
Witnesses
Geo. H. Strong,
Jno. L. Boone.
Inventor
Elisha W. Walton
by Dewey & Co.
Attys.

UNITED STATES PATENT OFFICE.

ELISHA W. WALTON, OF COLLINSVILLE, CALIFORNIA.

IMPROVEMENT IN GANG-PLOWS.

Specification forming part of Letters Patent No. 185,601, dated December 19, 1876; application filed May 16, 1876.

*To all whom it may concern:*

Be it known that I, ELISHA W. WALTON, of Collinsville, Solano county, State of California, have invented certain new and useful Improvements in Gang-Plows; and I do hereby declare the following description and accompanying drawings are sufficient to enable any person skilled in the art or science to which it most nearly appertains to make and use my said invention without further invention or experiment.

My invention relates to certain improvements in gang-plows, by which I am able to accommodate the action of the plows to the character of the ground over which they travel.

While ordinary gang-plows operate very well for plowing over level land they either utterly fail or plow very imperfectly on sidehills, or in passing over hilly or knolly land.

My improvements are intended to adapt this style of plowing-machine to uneven land, and so that they can be operated on the side of a hill so as to turn a full and complete furrow.

Referring to the accompanying drawings, Figure 1 is a perspective view of my invention. Fig. 2 is a longitudinal section of my machine.

Let A represent the axle, B B the wheels, and C the pole, of an ordinary gang-plow. The plow-beam D, which I have represented, has its forward end secured by a loop in front of the axle and above the pole, while its rear end projects behind the axle and carries the plows. Cams E, which are operated by a lever, F, are used for raising or lowering the plow-beam and plow, as described in my former Letters Patent dated July 19, 1870.

One improvement which I have added to this style of plow consists in the employment of links $g\, g$, one on each side, for connecting the beam with the pole in front of the axle. These links have one end of each secured to the plow-beam directly above the axle, while their opposite ends are secured to the pole in front of the axle. The links will then pull at an angle downward when the plows are at work, so as to keep the beam down upon the axle and the plows in the ground.

The loop $h$, under which the forward end of the beam passes, I make large enough to allow the outer end of the pole to work up and down while the plow is at work without interfering with the beam. This arrangement is quite useful in plowing over knolly land, as it provides a timber-pole which will not lift the plows when the wheels are passing over a summit or bottom.

Another feature which I have added to my gang-plow consists in securing the rear end of the pole to a plate, I, and then pivoting one end of the plate to the axle, while the opposite end of the plate can be adjusted back and forth independently of the axle by means of the lever J, thus allowing me to change the direction of the pole and plow-beam readily while the plows are working.

A rack, K, serves to retain the lever at the desired point. Several holes can be made in the axle, so that the plate I can be shifted to any point along the axle in order to accommodate the different inclinations upon which the plow is to work.

This arrangement is quite essential in plowing around a hill on a hill-side, as I can, by a motion of the lever, drop the plows toward the lower wheel, while the same motion directs the points of the plows up hill toward the land, thus counteracting the tendency of the plow to travel down the hill. I thus provide a simple and effective hill-side gang-plow.

Having thus described my invention, what I claim, and desire to secure by Letters Patent, is—

1. In combination with the plow-beam D, supported above the axle A and pole C, and operated by the cam E and lever F, the inclined links $g\, g$, substantially as and for the purposes described.

2. The combination of tongue C and slotted plate I, rigidly bolted to each other, one end of the plate being pivoted to the axle-tree, and the other end moved by the lever J, thus giving the plow more or less land, as desired.

In witness whereof I have hereunto set my hand and seal.

ELISHA W. WALTON. [L. S.]

Witnesses:
GEO. H. STRONG,
CHAS. G. PAGE.